(12) United States Patent
Strayer et al.

(10) Patent No.: US 7,814,546 B1
(45) Date of Patent: Oct. 12, 2010

(54) METHOD AND SYSTEM FOR INTEGRATED COMPUTER NETWORKING ATTACK ATTRIBUTION

(75) Inventors: William Timothy Strayer, West Newton, MA (US); Christine Elaine Jones, Spokane Valley, WA (US); Isidro Marcos Castineyra, Somerville, MA (US); Regina Rosales Hain, Winchester, MA (US)

(73) Assignees: Verizon Corporate Services Group, Inc., Basking Ridge, NJ (US); Raytheon BBN Technologies Corp., Basking Ridge, NJ (US)

( * ) Notice: Subject to any disclaimer, the term of this patent is extended or adjusted under 35 U.S.C. 154(b) by 1147 days.

(21) Appl. No.: 11/077,400

(22) Filed: Mar. 10, 2005

Related U.S. Application Data

(60) Provisional application No. 60/554,370, filed on Mar. 19, 2004.

(51) Int. Cl.
  G06F 11/00 (2006.01)
  G06F 12/14 (2006.01)
  G06F 12/16 (2006.01)
  G08B 23/00 (2006.01)
(52) U.S. Cl. ....................... 726/23
(58) Field of Classification Search .............. 726/23
  See application file for complete search history.

(56) References Cited

U.S. PATENT DOCUMENTS

| 6,009,469 | A  | * | 12/1999 | Mattaway et al. | 709/227 |
| 6,745,333 | B1 | * | 6/2004  | Thomsen | 726/23 |
| 6,981,158 | B1 | * | 12/2005 | Sanchez et al. | 726/2 |
| 7,200,105 | B1 | * | 4/2007  | Milliken et al. | 370/216 |
| 2002/0032871 | A1 | * | 3/2002  | Malan et al. | 713/201 |
| 2002/0078202 | A1 | * | 6/2002  | Ando et al. | 709/225 |
| 2003/0115485 | A1 | * | 6/2003  | Milliken | 713/201 |
| 2004/0098618 | A1 | * | 5/2004  | Kim et al. | 713/201 |
| 2004/0199791 | A1 | * | 10/2004 | Poletto et al. | 713/201 |
| 2005/0132219 | A1 | * | 6/2005  | Robert | 713/201 |

OTHER PUBLICATIONS

Belenky, A., and Ansari, On IP Traceback. *IEEE Communications Magazine 41*, 7 (2003), 142-153.
Bellovin, S.M., Leech, M., and Taylor, T. ICMP traceback messages. Internet Draft, Oct. 2001. draft-ietf-itrace-01.text (work in progress).
Bloom, B.H. Space/time trade-offs in hash coding with allowable errors. *Communications of ACM 13*, 7 (Jul. 1970), 422-426.
Buchholz, F.P. and Shields, C. Providing process origin information to aid in network traceback. *In Proc. USENIX Annual Technical Conference* (Jun. 2002).

(Continued)

*Primary Examiner*—Benjamin E Lanier
*Assistant Examiner*—Cordelia Zecher

(57) ABSTRACT

A system and method for determining the point of entry of a malicious packet into a network is disclosed. An intrusion detection system detects entry of the malicious packet into the network (500). A stepping stone detection system identifies stepping stones in extended connections within the network (524). A traceback engine isolates the malicious packet in response to operation of the intrusion detection system (528), wherein the traceback engine utilizes the identified stepping stones to determine the point of entry of the malicious packet.

22 Claims, 4 Drawing Sheets

OTHER PUBLICATIONS

Burch, H., and Cheswick, B. Tracing anonymous packets to their approximate source. In *Proc. USENIX LISA '00* (Dec. 2000).

Cappe, O., Moulines, E. Pesquet, J.C., Petropulu, A., Yang, X. Long-range dependence and heavy-tail modeling for teletraffic data. *IEEE Signal Processing Magazine 19-3 (2002)*, 14-27.

Carrier, B., and Shields, C. A recursive session token protocol for use in computer forensics and tcp traceback. In *Proc. IEEE Infocom '02* (Jun. 2002).

Donoho, D.L., Flesia, A.G., Shankar, U., Paxson, V., Coit, J., and Staniford, S. Multiscale stepping-stone detection: Detecting pairs of jittered interactive streams by exploiting maximum tolerable delay. *In Proc. International Symposium on Recent Advances in Intrusion Detection* (Oct. 2002), pp. 14-35.

Egevang, K., and Francis, P. The ip network address translator. RFC 1631, May 1994.

Fan, L., Cao, P. Almeida, J., and Broder, A.Z. Summary cache: a scalable wide-area web cache sharing protocol. *ACM/IEEE Trans. On Networking 8*, 3 (2000), 281-293.

Ferguson, P. and Senie, D. Network ingress filtering: Defeating denial of service attacks which employ IP source address spoofing. RFC 2267, Jan. 1998.

Hazeyama, H., Oe, M., and Kadobayashi, Y. A layer-2 extension to hash-based IP traceback. *IEICE Trans. on Information & Systems*, Nov. 2003.

Howard, J.D. An analysis of security incidents on the internet. 1989-1995. PhD Thesis. Apr. 1997. http://www.cert.org/research/JHThesis/Start.html.

Johns, M. S. Identification Protocol. RFC 1413, Feb. 1993.

Jones, C.E., Tchakountio, F., Snoeren, A.C., Schwartz, B., Clements, R.C., Condell, M., Partridge, C., and Strayer, W.T. Traceback of ip packet transformations. Internal technical memo, BBN Technologies, 2002.

Jung, H.T., Kim, H.L., Seo, Y., Choe, G., Min, S.L., and Kim, C.S. Caller identification system in the internet environment. In *Proc. USENIX Security Symposium '93* (Oct. 1993).

Lee, S.C., and Shields, C. Tracing the source of network attack: A technical, legal and societal problem. In Proc. *IEEE Systems, Man, and Cybernetics Information Assurance Workshop* (2001).

Libes, D. The Expect home page. Tech. rep., National Institute of Standards and Technology. http://expect.nist.gov/, Jun. 11, 2004.

Mankin, A., Massey, D., Wu, C.L. Wu, S.F., and Zhang, L. On design and evaluation of "intention-driven" ICMP traceback. In *Proc. IEEE International Conference on Computer Communications and Networks* (Oct. 2001).

Partridge, C., Cousins, D.B., Jackson, A.W., Krishnan, R., Saxena, T., and Strayer, W.T. Using signal processing to analyze wireless data traffic. In Proc. *ACM Workshop on Wireless Security (WiSe)* (Sep. 2002).

Paxson, V. Bro: A system for detecting network intruders in real-time. In *Proc. USENIX Security Symposium*, Jan. 1998.

Paxson, V. An analysis of using reflectors for distributed denial-of-service attacks. *ACM Comp. Comm. Review 31.3* (2001).

Perkins, C.E. IP mobility support for IPv4. RFC 3344. Aug. 2002.

Rekhter, Y., Moskowitz, B., Karrenberg, D., De Groot, G.J., and Lear, E. Address allocation for private internets. RFC 1918, Feb. 1996.

Sager, G. Security fun with OCxmon and cflowd. Internet 2 Working Group Meeting, Nov. 1998. http://www.caida.org/projects/NGI/content/security/1198.

Sanchez, L.A., Milliken, W.C., Snoeren, A.C., Tchakountio, F., Jones, C.E., Kent, S.T., Partridge, C., and Strayer, W.T. Hardware support for a hash-based IP traceback. *In Proc. Second DARPA Information Survivability Conference and Exposition* (Jun. 2001), vol. 2, pp. 146-152.

Savage, S., Wetherall, D., Karlin, A., and Anderson, T. Network support for IP traceback. *ACM/IEEE Trans. on Networking 9, 3* (Jun. 2001), 226-239.

Schnackenberg, D., Djahandari, K., and Sterne, D. Infrastructure for intrusion detection and response. In *Proc. First DARPA Information Survivability Conference and Exposition* (Jan. 2000).

Snapp, S.R., Brentano, J., Dias, G.V., Goan, T.L., Heberlein, L.T., Ho, C.L., Levitt, K.N., Mukherjee, B., Smaha, S.E., Grance, T., Teal, D.M., and Mansur, D. DIDS (distributed intrusion detection system)- motivation, architecture, and an early prototype. In *Proc. National Computer Security Conference* (Oct. 1991), pp. 167-176.

Snoeren, A.C., Partridge, C., Sanchez, L.A., Jones, C.E., Tchakountio, F., Schwartz, B., Kent, S.T., and Strayer, W.T. Single-packet IP traceback. *ACM/IEEE Trans. on Networking* (Dec. 2002).

Song, D.X., and Perrig, A. Advanced and authenticated marking schemes for IP traceback. In *Proc. IEEE Infocom '01* (Apr. 2001).

Staniford-Chen, S., and Heberlein, L.T. Holding intruders accountable on the internet. In *Proc. IEEE Symposium on Security and Privacy '95* (May 1995), pp. 39-49.

Stone, R. CenterTrack: An IP overlay network for tracking DoS floods. In *Proc. USENIX Security Symposium '00* (Aug. 2000).

Wang, X., and Reeves, D.S. Robust correlation of encrypted attack traffic through stepping stones by manipulation of interpacket delays. In *Proc. ACM Symposium on Computer and Communications Security (CCS)* (Oct. 2003).

Wang, X., Reeves, D.S., and Wu, S.F. Inter-packet delay based on correlation for tracing encrypted connections through stepping stones. In *Proc. European Symposium on Research in Computer Security* (Oct. 2002), pp. 244-263.

Wang, X., Reeves, D.S., Wu, S.F., and Yuill, J. Sleepy watermark tracing: An active network-based intrusion response framework. In *Proc. International Conference on Information Security* (Jun. 2001), pp. 369-384.

Yoda, K., and Etoh, H. Finding a connection chain for tracing intruders. In *Proc. European Symposium on Research in Computer Security* (Oct. 2000), pp. 191-205.

Zhang, Y., and Paxson, V. Detecting stepping stones. *In Proc. USENIX Security Symposium '00* (Aug. 2000), pp. 171-184.

\* cited by examiner

METHOD AND SYSTEM FOR INTEGRATED COMPUTER NETWORKING ATTACK ATTRIBUTION

CROSS-REFERENCE TO RELATED APPLICATIONS

The present application claims priority to U.S. Provisional Patent Application No. 60/554,370, filed Mar. 19, 2004, the entirety of which is incorporated by reference herein.

GOVERNMENT INTEREST

The invention described herein was made with government support. The U.S. Government may have certain rights in the invention, as provided by the terms of contract No. N66001-00-8038, awarded by the National Security Agency (NSA).

BACKGROUND

1. Field of the Invention

The present invention relates generally to communication networks, and more specifically, to the discovery of routes used by data transmitted over such networks.

2. Description of Related Art

Availability of low cost computers, high speed networking products, and readily available network connections has helped fuel proliferation of the Internet. This proliferation has caused the Internet to become an essential tool for both the business community and private individuals. Dependence on the Internet arises, in part, because the Internet makes it possible for multitudes of users to access vast amounts of information and perform remote transactions expeditiously and efficiently. Along with the rapid growth of the Internet have come problems caused by malicious individuals or pranksters launching attacks from within the network. As the size of the Internet continues to grow, so does the threat posed by these individuals.

The ever-increasing number of computers, routers and connections making up the Internet increases the number of vulnerability points from which these malicious individuals can launch attacks. These attacks can be focused on the Internet as a whole or on specific devices, such as hosts or computers, connected to the network. In fact, each router, switch, or computer connected to the Internet may be a potential entry point from which a malicious individual can launch an attack while remaining largely undetected. Attacks carried out on the Internet often consist of malicious packets being injected into the network. Malicious packets can be injected directly into the network by a computer, or a device attached to the network, such as a router or switch, can be compromised and configured to place malicious packets onto the network.

In spite of the development of many sophisticated defense mechanisms such as intrusion detection systems and firewalls, such malicious attacks continue to increase. This is due in part because of a perceived lack of accountability: the anonymous nature of the Internet and its protocols makes it difficult to accurately identify the source of a network attack when the perpetrator wishes to conceal it. In fact, an attacker can generate attacks that appear to have originated from anywhere or nowhere.

There are several reasons why computer networks, especially the Internet, are particularly prone to attacks. First, since networks facilitate remote operations, an attacker may be physically separated from the target. This separation provides some degree of protection. Second, the design of the Internet emphasizes fault tolerance, efficiency, and usefulness over accountability. The legitimacy of IP source addresses is not universally enforced. Routing algorithms are purposefully stateless to facilitate rapid recovery or rerouting of traffic after failure. Login identifiers also hide identity; rather than being the true name of the individual, it is a handle without a strong binding to any real identifying properties at all. In fact, the lack of a strong binding of user to individual is a universal problem, and techniques like PKI (public key infrastructure) seek to make identity and authentication based on identity an integral part of the network. So far such efforts have failed to achieve traction.

Finally, the sociological aspects of the Internet support the establishment and maintenance of loosely coordinated subcultures, complete with group dynamics and peer pressures, some of which reward daring feats. From chat rooms to hacker and cracker communities, individuals say and do things they may never attempt off-line because they have created an alter-ego for their presence on-line, where real names and identities are not being revealed.

Anonymity is a liberating differentiator; inhibitions are relaxed when the fear of being identified is reduced or removed. This is true for most social situations, but more nefariously, anonymity emboldens individuals with ill intentions to act in destructive ways. Often, network-based attacks are perpetrated by individuals seeking to hide their identities. One of the simplest ways to remain anonymous is to hide the source of an attack by chaining together multiple connections into an extended connection. This is typically done by logging into a remote host, then from there logging into a third and fourth and so on until, at the final host, an attack is launched. These intermediate hosts are often referred to as "stepping stones". Tracing such an attack back to the original source is difficult. Some techniques exist to trace individual connections. However, tracing an extended connection requires identifying related connection pairs at each stepping stone.

The attribution problem can be divided into two parts: (1) finding the source of a flow of attack packets, called the IP Traceback Problem, and (2) discovering which sources are acting to launder the attack, called the Stepping Stone Problem. Consequently, three types of attack sources may be identified: an originating source, stepping stones, and immediate sources. The originating source of an attack, also referred to as the attack source, is the point of origin from which the attacker injects traffic into the network. In the presence of an extended connection, the originating source is the host that initiates the first connection in the connection chain. Stepping stones include intermediate hosts (or routers acting as hosts) along the traversed path of an attack that are exploited to conceal the originating source. The immediate source is the actual host to issue a packet and is also referred to as the packet source. The immediate host may be either the originating source or an intermediate stepping stone. The ability to identify the immediate source of packets is a necessary first step in identifying the originating source of an attack. Yet identifying a packet's source is complicated by both legitimate actions taken upon the packet by the routers as well as the always-present possibility of malicious actors along the packet's path.

There remains a need in the art for effective and efficient methods and systems for performing IP traceback and stepping stone detection so as to accurately attribute network attacks.

SUMMARY

Systems and methods consistent with principles of the invention may identify a point of entry of a malicious packet into a network. In one implementation, an intrusion detection system may detect entry of the malicious packet into the network. A stepping stone detection system may identify stepping stones in extended connections within the network. A traceback engine may isolate the malicious packet in response to operation of the intrusion detection system, the traceback engine using the identified stepping stones to determine the point of entry of the malicious packet.

In another implementation consistent with the present invention, in a network carrying a plurality of packets at least one of the packets being a target packet, the network includes at least one network component, a detection device and a traceback engine, a technique is provided for determining a point of entry of a target packet into the network. The target packet is received from the detection device at the traceback engine. A query message is sent to a first component of the at least network component, where the query message identifies the target packet. A reply containing information about the target packet is received from the first component. The reply is processed to extract information. A second query message is sent to a second component to identify possible correlated connections. A reply containing information about the target packet is received from the second component. The reply is processed to extract information. The point of entry is determined based on the information.

In a further aspect of the invention, a computer-readable medium is provided for determining a point of entry of a target packet into a network, the network including a network component for generating a representation of an intruding packet, a second network component for identifying correlated connection pairs in the network, a traceback engine, and an intrusion detection device. One or more instructions are provided for generating a query message comprising information about at least a portion of the intruding packet, the query message being created by the traceback engine in response to a triggering event indicating the intruding packet was detected by the intrusion detection device. One or more instructions are provided for receiving a reply generated by the network component in response to the query message, the network component matching the representation to the information in the query message and indicating a match therebetween, the match indicating the intruding packet has been encountered and indicates the source and destination addresses of the intruding packet. One or more instructions are provided for generating a second query message comprising information about at least outgoing connection information for the intruding packet, the second query message being created by the traceback engine. One or more instructions are provided for receiving a reply generated by the second network component in response to the second query message, the second network component identifying an incoming connection correlated to the outgoing connection and indicating a representative packet and time last seen.

In yet a further aspect of the invention, in a network carrying a plurality of packets, the plurality of packets including a target packet having entered the network through an intrusion location, a method is provided for determining the point of entry of a malicious packet into the network. A triggering event is processed to extract information about the target packet. A query is generated for placement onto the network, the query including at least a representation of the information about at least a portion of the target packet. The query is sent to a network component. A reply is received from the network component, the reply including at least outgoing connection information for identified matching packets. The reply is processed. A second query is generated for placement onto the network, the second query including a least the outgoing connection information. The second query is sent to a second network component. A second reply is received from the second network component, the second reply indicating an incoming connection associated with the outgoing connection. The second reply is processed and used to facilitate identification of the intrusion location.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Methods and systems consistent with the principles of the invention may simultaneously perform IP traceback of attack packets and stepping stone detection.

Exemplary Network Configuration

Figure 2:
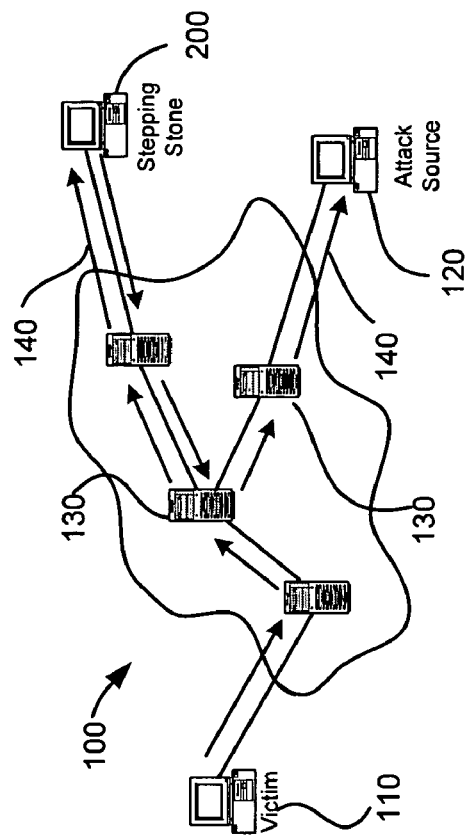
FIG. 2 is a diagram illustrating an exemplary network according to another implementation consistent with the present invention.
Figure 1:
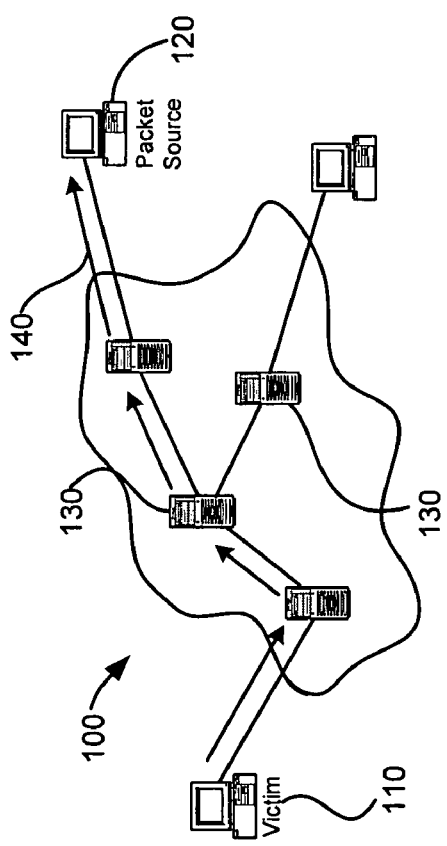
FIG. 1 is a diagram illustrating an exemplary network according to an implementation consistent with the present invention.

FIG. 1 is a diagram illustrating an exemplary network 100 traversed during a network attack. Network 100 includes a victim host 110, a packet source host 120 and several intermediate routers 130 which facilitate movement of the attack from the source to the victim. As discussed above, an IP traceback that reaches a host has identified a potential source of a packet. However, this does not mean that the source of the attack has necessarily been determined. As shown in FIG. 2, the host may actually be a stepping stone host 200 mid-stream of the actual attack source 120.

Tracing an attack path through stepping stone hosts 200 requires the discovery of an association between two connections with endpoints at that host such that these connections act as consecutive links in a chain of connections. The chain of connections between an originating (or attack) source and the victim form what is called an extended connection.

An extended connection is constructed by a series of individual connections linked in a pairwise fashion and related by carrying the same underlying data (carried as plain text or encrypted text) serially across each connection from the originating source to the ultimate destination. A connection pair is any two adjacent connections in the extended connection.

Once an extended connection has been identified, the attribution process turns to identifying two connections as related links in a larger chain of connections. Three classes of intermediate hosts may be used by an attacker to launder attack data and to obfuscate the attack path: stepping stones, zombies, and reflectors. An extended connection employed for launching an attack may involve any type and any number of such intermediate hosts.

Stepping Stones

The simplest type of intermediate host is a stepping stone host. Such a host is compromised to the extent that the attacker can log into the host and establish an outgoing interactive connection (such as telnet, rlogin, or ssh) to the next host in the attack path. The attacker's communications are not fundamentally altered, though enough may change to evade some methods of detection. For instance, if one or both connections are established as an encrypted session, encryption will prevent use of any traceback method based on packet content. Processing delays in the host may superficially alter timing of packets. An attacker will usually chain multiple stepping stones together to further screen the attack's origin.

An attacker need not deeply compromise a host to create a stepping stone. All that is needed is access to an ordinary user's privileges to log in and to make outgoing connections. Such access can be gained, for instance, by dictionary attacks on password files or by snooping for passwords in Internet cafes or computer labs. Root access (or equivalent) is rarely required, though a more permanent back door could be more easily established with such privileges.

One difficulty with the detection of stepping stones 120 is the large number of legitimate uses of extended connections. Commonly, access to hosts by legitimate users from outside a network is via a trusted gateway through which the user connects to the target host.

Zombies

A zombie host can be defined as an intermediate host at which incoming communication is transformed such that the resulting outgoing communication appears to be wholly unconnected, and delays measured in hours or days are introduced prior to the establishment of the outgoing communication. The attacker's incoming communication may be script and code that installs a Trojan, and the attack's output might come days or months later (say in response to a cron table entry). Another zombie may accept simple trigger commands from the attacker to execute previously planted code that issues entirely different output, for instance as part of a distributed denial-of-service (DDoS) attack.

The lack of apparent relationship between the incoming attack stream and the outgoing attack data, as well as the extremely long interval that may ensue between the end of one and the start of the other, makes the traceback problem in the network a very difficult one. Consider the example of a DDoS attack being triggered by a timer. Once the attack is under way, it is generally easy to determine the immediate source of the last link or two in the attack path. But once the zombie running the Trojan script is identified, it is difficult to associate the attack output with the incoming communication that generated the attack. Since the incoming connection (over which the Trojan was downloaded and installed) could have existed weeks or more in the past, the network may retain no information about it. An investigator may examine host logs, if access can be obtained, but even then a cleverly written Trojan may have altered those logs when installed. Even if the DDoS attack is initiated by a packet containing a trigger command, there may very likely be insufficient data to associate that trigger packet with the outgoing attack connection.

Reflectors

It is also possible to launder an attack through an innocent, intact host operating normally, by using it as a reflector. For instance, an attacker logged into a host (possibly as part of an attack chain) may generate packets with the IP address of the ultimate attack victim forged as the source of the packets. The response packets are directed to the victim and constitute the actual attack. By bouncing such spoofed packets off a large number of normally operating reflectors, massive quantities of bogus responses are directed at the victim. This attack must be detected in the network, as there is no need for the attacker ever to have communicated with the reflector to set up the attack, hence no evidence of the attack or any tampering can be found on the host.

Attributing an attack to a particular source or set of sources requires understanding what can happen to the packets used to perpetuate the attack as they traverse the network. The IP routing infrastructure is stateless and based largely on destination addresses; the source address plays virtually no role in the forwarding of a packet to its destination other than providing a return address in the case of bidirectional communication. In this respect, IP packets are essentially fire-and-forget types of delivery mechanisms; once a packet is introduced into the network, there is no need for the packet to maintain any relationship with its source. The source IP address carries no semantic of trust, but it is the only clue built into the network infrastructure as to the proper source. Attackers take advantage of this property of the IP protocol by manipulating—either directly or indirectly—the source address of attack packets to obscure their true origin.

Known stepping stone detection techniques generally attempt to determine the correlation between all pairs of connections such that the pairs related by being part of the same extended connection will have correlation scores that are higher than those that are not related. Unfortunately, these techniques make several simplifying assumptions about the network that may not be valid in an operational environment. A first assumption is that the source address is valid because TCP connections require bidirectional communication. It may be true that an attacker cannot effectively use a connection, especially an interactive one, with a spoofed source address, but this does not mean that the network is preserving the source address. Rather, the source address is actively modified by the network when the source is part of a privately addressed network, as one connected to the Internet via a network address translator (NAT). In this case, the source address may be an address from the non-routable private address space as defined by RFC 1918. The attacker establishes a connection from his private network through a NAT to a compromised system in the Internet, possibly also within a privately addressed or corporate network where the IP addresses are not routable or not known.

A second assumption is that connection pairs are easily stitched together to form the fully reconstructed extended connection. Consider three connections between four hosts, $H_1 \leftrightarrow H_2$, $H_2 \leftrightarrow H_3$, and $H_3 \leftrightarrow H_4$. The pair ($H_1 \leftrightarrow H_2$, $H_2 \leftrightarrow H_3$) can be detected at some point where all traffic into and out of $H_2$ is seen. Likewise with the pair ($H_2 \leftrightarrow H_3$, $H_3 \leftrightarrow H_4$). However, matching the two pairs into an extended connection assumes that, given one pair, the stitching algorithm knows where to find the other. The obvious clue is $H_3$'s address, but this suggests that there must be some global mapping of each host's address onto the data collection point handling the detection of stepping stones for that host. Outside of maintaining such a mapping, the easiest and most effective way to find the data collection point is if those points are closely tied to the routing infrastructure since the mapping of hosts onto routers is fairly well understood.

Integrating stepping stone detection with IP traceback addresses these two problems. Successful IP traceback system does not rely on the source address in the packet during traceback. Since a packet can be easily associated with a connection, tracing any one of the packets in a connection will find the origin of the connection, even if that origin is obscured in some way. Further, successful IP traceback systems assemble the entire path of a packet, specifically each router that a packet passed through. This implies that the traceback system is closely integrated with or somehow relies upon the routing infrastructure of the network.

Exemplary Stepping Stone Discovery

In one implementation consistent with principles of the invention, an attack attribution system is provided that is comprised of several processes, including one master function that monitors each of the individual processes and aggregates their results into a composite score. In this manner, advantages and disadvantages inherent in the processes may be exploited or mitigated.

The master function operates to aggregate the results of these processes into a single score used to determine the correlated pairs of connections passing through a detection point. Stepping stone detection processes issue results with less than complete certainty; there is some degree of likelihood associated with each result. Further, each of these processes may use different methods for determining a likely connection pair. Some may use thresholds, some may use probabilities, and some make declarative statements. The master function may assimilate these answers, may weight them, and construct a representation of the consensus.

Additionally, the stepping stone detection system also considers the placement of the detection systems. It can be assumed that hosts are not multi-homed, and therefore use a single identifiable router for all incoming and outgoing traffic. This means that the router serving a host acting as a stepping stone will see the traffic for both connections in the connection pair. This router is called a stub router herein. Given that the router is the only sure point of commonality for the traffic, this can be considered the appropriate location for stepping stone detectors. Further, given an IP traceback system that can determine the ingress router for a given packet, this stub router may be the ingress router for packets associated with the outgoing connection originating at the host behind the router. It may also be the last router to have seen the packets on the incoming connection and, therefore, be the natural starting place for a trace of packets associated with that incoming connection to determine that connection's ingress point (which possibly has evidence of another stepping stone, and, therefore, another connection to trace).

Specific details regarding the manner of detecting correlated connection pairs are not disclosed herein. It should be understood that any known systems and methods for identifying or estimating such correlated pairs may be incorporated into the system of the present invention.

Exemplary IP Traceback System Configuration

In one implementation, the stepping stone detection architecture may be coupled with an IP traceback system that can trace single packets, determine the ingress router, and maintain a presence at each router in the network. In one implementation consistent with principles of the invention, a Source Path Isolation Engine (SPIE) (400 in FIG. 4) is used as an IP traceback system. SPIE is a log-based traceback system that uses efficient auditing techniques at network routers to support the traceback of individual IP packets. Traffic auditing is accomplished by computing and compactly storing packet digests rather than storing the packets themselves. Packets traversing a SPIE enhanced router are recorded in a digest table. Digest tables may be paged at a specified rate and are representative of the traffic forwarded by the router during a particular time interval. A cache of digest tables may be maintained for recently forwarded traffic.

If a packet is determined to be offensive by some intrusion detection system (or judged interesting by some other metric), a trace request is dispatched to the SPIE system which in turn queries routers for packet digests of the relevant time periods. The results of this query may be used in a simulated reverse-path flooding process to build an attack graph that indicates the packet's source(s).

The SPIE system may reduce the memory requirement through the use of Bloom filters. By storing only packet digests, and not the packets themselves, SPIE also does not increase a network's vulnerability to eavesdropping. SPIE's traffic auditing allows routers to efficiently determine if they forwarded a particular packet within a specified time interval while maintaining the privacy of unrelated traffic. Rather than hash the entire packet, it has been found (for IPv4) that the first 8 bytes of payload, along with the immutable fields from the header, are sufficient to differentiate almost all non-identical packets. It should be understood, that additional amounts of payload data (e.g., 16 bytes, 19 bytes, 24 bytes, etc.) may also be utilized in accordance with the present invention.

Bloom Filters

Figure 3:
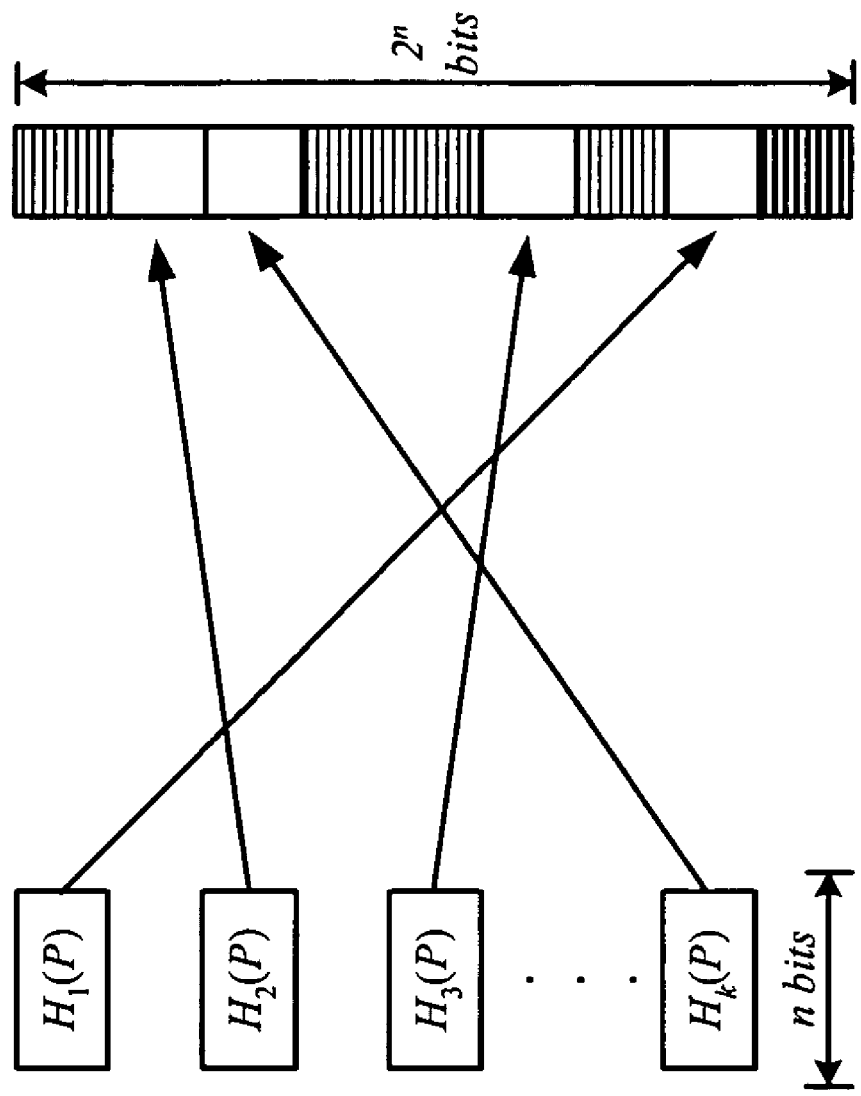
FIG. 3 depicts an exemplary Bloom filter with k hash functions in accordance with an implementation consistent with the present invention.

The SPIE system implements digest tables using space-efficient data structures known as Bloom filters. FIG. 3 illustrates a Bloom filter having k hash functions. A Bloom filter computes k distinct packet digests for each packet using independent uniform hash functions, and uses the n-bit results to index into a $2^n$ single-bit array. The array is initialized to all zeros, and bits are set to one as packets are received.

Membership tests can be conducted simply by computing the k digests on the packet in question and checking the indicated bit positions in the single-bit array. If any one of them is zero, the packet was not forwarded by the router presently being queried. If, however, all the bits are one, it is highly likely the packet was forwarded. It is possible that some set of other insertions caused all the bits to be set, creating a false positive, but the rate of such false positives can be controlled by only allowing an individual Bloom filter to store a limited number of digests. A saturated filter may be swapped out for a new, empty filter, and archived for later querying.

IP Traceback System Architecture

Figure 4:
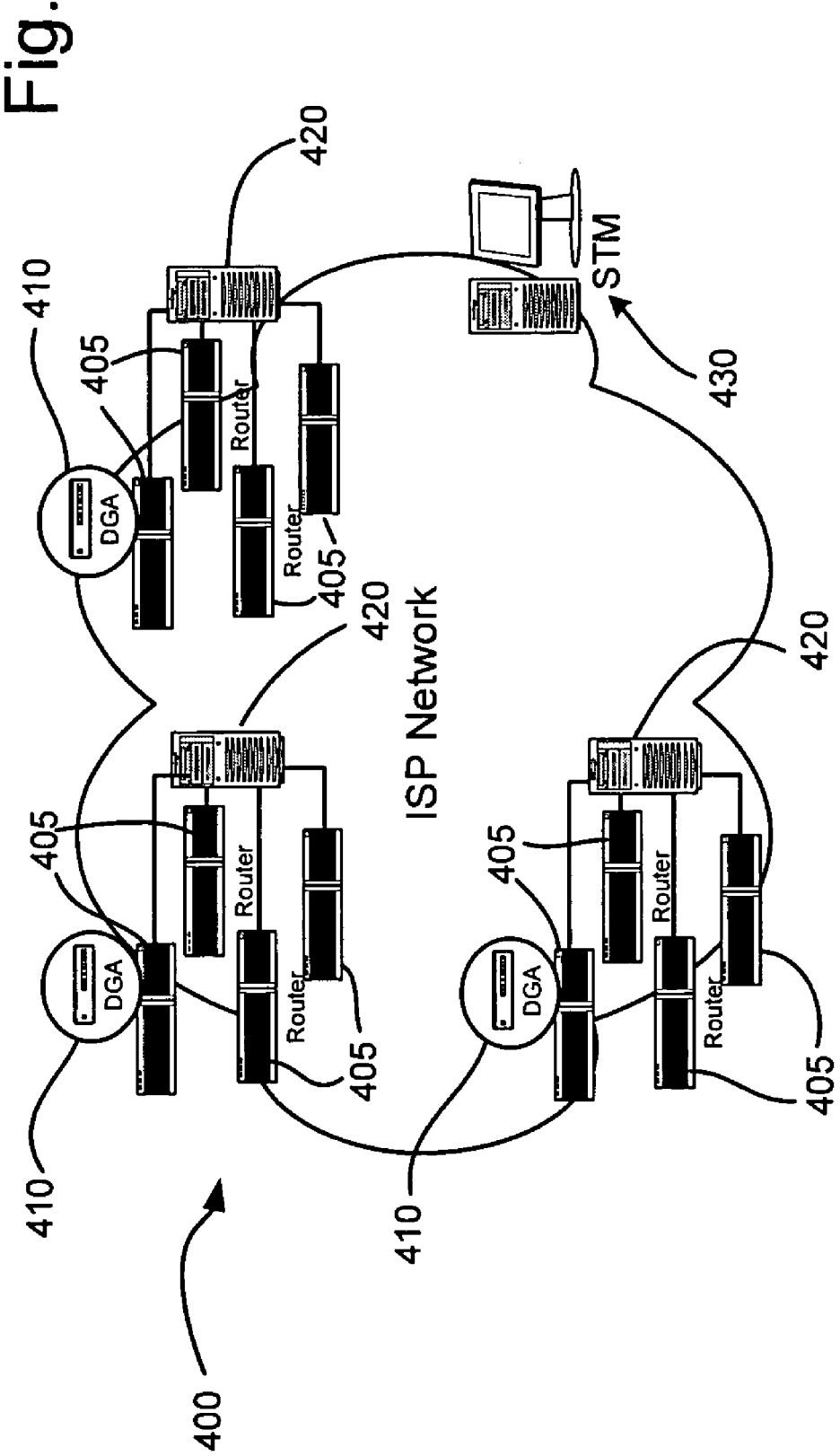
FIG. 4 is a diagram illustrating an exemplary network including IP traceback components according to another implementation consistent with the present invention.

The tasks of packet auditing, query processing, and attack graph generation are dispersed among separate components in the SPIE system. FIG. 4 shows the three major architectural components of the SPIE system 400. Each SPIE-enhanced router 405 may include a Data Generation Agent (DGA) 410 associated with it. The DGA 410 produces packet digests of each packet as it is forwarded through the router, and stores the digests in time-stamped digest tables. The tables are paged or refreshed every so often, and represent the set of traffic forwarded by the router for a particular interval of time. Each table is annotated with the time interval and the set of hash functions used to compute the packet digests over that interval. The digest tables are stored locally at the DGA 410 for some period of time, depending on the resource constraints of the router.

SCARs (SPIE Collection and Reduction Agents) 420 may be responsible for a particular region of the network, serving as data concentration points for several routers and facilitating traceback of any packets that traverse the region. When a trace is requested, each SCAR 420 produces an attack graph for its particular region. The attack graphs from each SCAR 420 are grafted together to form a complete attack graph by the SPIE Traceback Manager (STM) 430.

STM 430 controls the whole SPIE system 400. The STM 430 is the interface to the intrusion detection system or other entity requesting a packet trace. When a request is presented to the STM 430, it verifies the authenticity of the request, dispatches the request to the appropriate SCARs 420, gathers the resulting attack graphs, and assembles them into a complete attack graph. Upon completion of the traceback process, the STM 430 replies to the intrusion detection system with the final attack graph.

IP Traceback System Processing

Figure 5:
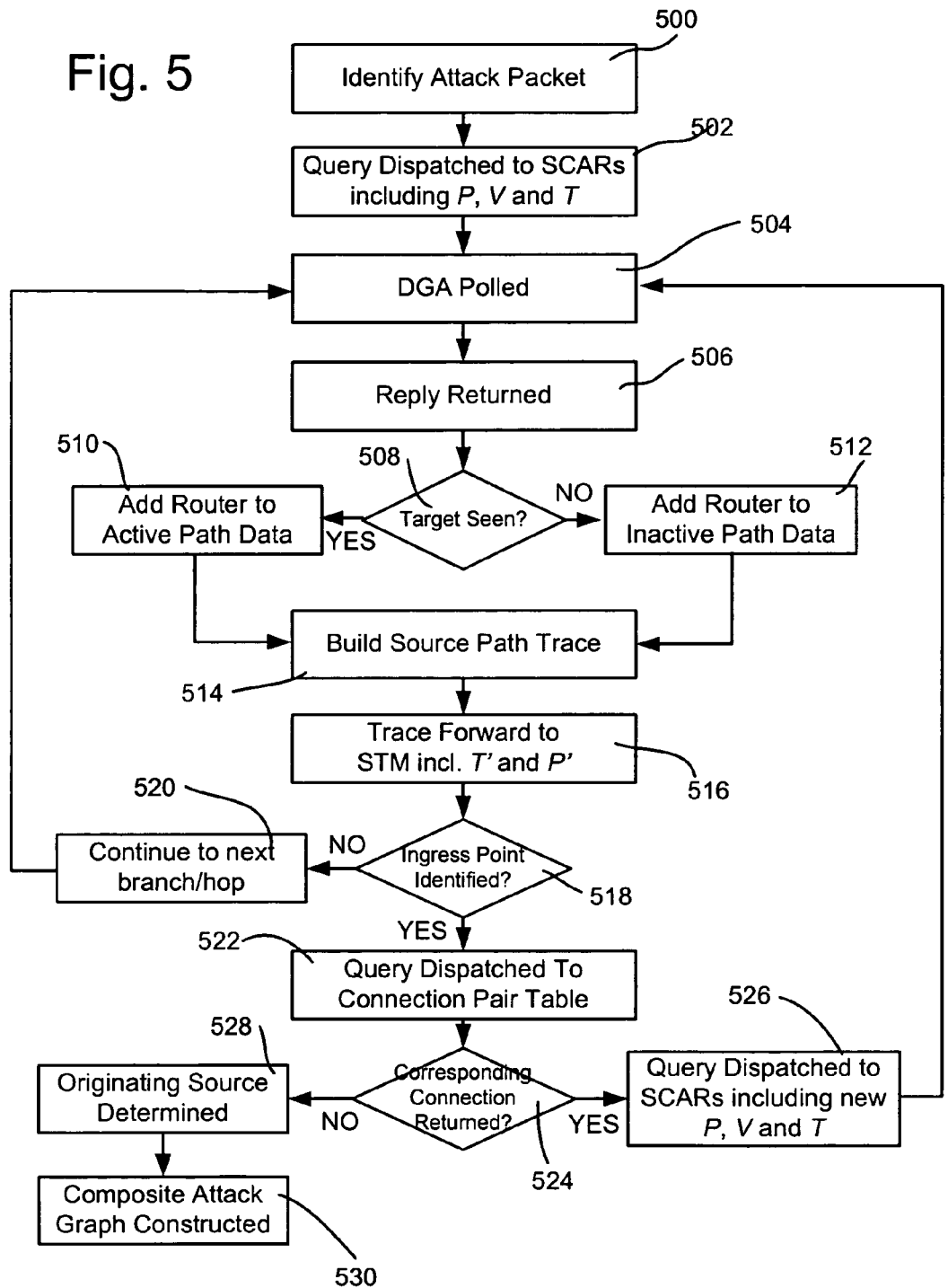
FIG. 5 is an exemplary flow chart illustrating one implementation of IP traceback processing consistent with principles of the invention.

FIG. 5 is an exemplary flow chart illustrating one implementation of IP traceback processing consistent with principles of the invention. Before the traceback process can begin, an attack packet is identified (act 500). Most likely, an intrusion detection system will determine that an exceptional event has occurred and provide STM 430 with a packet, P, victim, V, and time of attack, T. SPIE places two constraints on the intrusion detection system: 1.) the victim should be expressed in terms of the last-hop router, not the end host itself, and 2.) the attack packet should be identified in a timely fashion. The first requirement provides the query process with a starting point; the latter stems from the fact that traceback must be initiated before the appropriate digest tables are overwritten by the DGAs. This time constraint is directly related to the amount of resources dedicated to the storage of traffic digests.

Upon receipt of a traceback request, STM 430 dispatches the query to the relevant SCARs 420 for processing (act 502). Beginning at the SCAR 420 responsible for the victim's region of the network, STM 430 sends a query message containing P, V and T as provided by the intrusion detection system (IDS). SCAR 420 then polls each of its associated DGAs 410 (act 504). After processing the received query, each DGA 410 may send a reply to SCAR 420 (act 506). The response may indicate that a queried router has seen the target packet P, or alternatively, that it has not (act 508).

If a queried DGA 410 has seen the target packet, a reply and identification (ID) information for the respective router/DGA is associated as active path data (act 510). Alternatively, if DGA 410 has not seen the target packet, the reply is associated as inactive path data (act 512). Replies received from queried DGAs are used to build a source path trace of possible paths taken by the target packet through the network using known methods (step 514). The source path trace is forwarded to STM 430 and includes a partial attack graph, the time T' the packet entered the SCAR's region, and the entering packet itself P' (it may have been transformed, possibly multiple times, within the region) (act 516).

STM 430 may then attempt to identify the ingress point for the target packet P' (act 518). If STM 430 is unable to determine the ingress point of the target packet, subsequent responses from participating routers located an additional hop (i.e., in another SCAR's region) away are processed by executing steps 506-518 again (act 520). This query uses the border router between the two network regions as its victim, V', and T' as the time of attack. This process repeats until all branches of the attack graph terminate, either at a source within the network, or at the edge of the SPIE system.

Examples of source path tracing techniques that may be employed with embodiments disclosed herein are, but are not limited to, a breadth-first search or a depth-first search. In a breadth-first search, all routers/DGAs in a region are queried to determine which routers/DGAs may have observed a target packet. One or more graphs, containing nodes, are generated from the responses received by their associated SCAR. Where the nodes indicate locations that the target packet may have passed. Any graphs containing a node where the target packet was observed are associated as active, or candidate, paths, i.e. paths that the target packet may have traversed. With a depth-first search, only routers/DGAs adjacent to a location where the target path was observed are queried. Routers/DGAs issuing a positive reply are treated as starting points for candidate graphs because they have observed the target packet. Next, all routers/DGAs adjacent to those that responded with a positive reply are queried. The process of moving the query/response process out one hop at a time is referred to as a round. This process is repeated until all participating routers have been queried or all routers/DGAs in a round respond with a negative reply indicating that they have not observed the target packet. When a negative reply is received, it is associated as inactive path data.

Because an identified ingress point may actually be a stepping stone host, the system of the present invention further enhances IP traceback accuracy by incorporating stepping stone detection at perceived ingress points. Consider any given packet or data unit that may be part of a connection. It is easy to associate that packet with all other packets in the same connection by matching the source and destination IP addresses and ports; all packets that exactly share these values are, for some period of time, packets within the same connection. It should be noted that this is "for some period of time" because connection identification material can be reused after it has been held unused for an amount of time far exceeding the lifetime of any packet within the network. Nonetheless, any packet that is part of a connection can be definitively identified as part of that connection. Consequently, any given packet from a connection can be used by the SPIE system 400 to trace to the source of that connection.

Once SPIE system 400 has traced a target packet to the router 405 nearest to the immediate source, it can be assumed that any connection that is part of a stepping stone connection pair must also have come through this router. The stepping stone detection processes discussed above are therefore deployed at or near these (and all other) routers which serve as the first hop for any hosts. Furthermore, in the manner set forth above, the stepping stone detection processes and associated master function have continually produced a table of connection pairs such that, given an outgoing connection, the table indicates the incoming connection (if any) relating to the identified ingress point.

In order to continue the trace across the stepping stone, STM 430 queries the established connection pair table to determine the next connection to trace (act 522). Since the SPIE system trace already has a representative packet (P') within the outgoing connection, it is easy to look up the outgoing connection in the table. STM 430 then receives corresponding incoming connection information from the table (act 524). It should be noted that SPIE system 400 requires a specific example of a packet to conduct the trace. Accordingly, the connection pair table generated/populated during stepping stone discovery should include a representative packet field.

As described above, the SPIE system utilizes three pieces of information to perform an IP traceback: 1.) the packet, 2.) the time the packet was seen, and 3.) the last router known to have seen the packet. The table, therefore, returns not only the packet but also the time that packet was seen. The last router known to have seen the packet is the current router since this must be the last router used by the incoming connection.

Since the SPIE system is sensitive about the age of the packets it traces—the older the packet, the less likely evidence of the packet's path is still kept in the Bloom filters in the SPIE DGAs—the packet that gets installed into the connection pair table should be the last packet seen on the incoming connection, along with the time that packet was seen. This gives the SPIE system the best chance of completing the trace with the incoming connection's representative packet since it is the newest packet on that connection.

Upon request by the SPIE system, the connection pair table will return the correlated incoming connection and one representative packet from the connection and the time the packet was seen. The SPIE system can then construct a new query based on the new target packet and time from the incoming connection (act 526), and continue the trace in the manner described above to once again find the ingress router for the connection. Again, the connection pair table is consulted, and additional packet traces may be launched (even tracing through NAT boxes, if necessary), until at some point the table does not report a correlated connection. At this point, the trace terminates with the last ingress router, which is as far as the SPIE system can go. However, since the traced packet is part of a connection and, therefore, must have a valid source address that can be used for returning packets such as acknowledgments, the host that is the actual originating source can be easily determined (act 528). STM 430 then constructs a composite attack graph which it returns to the intrusion detection system (act 530).

CONCLUSION

Methods and systems consistent with the principles of the invention may discover stepping stones within an attack path topology by examining elapsed times between one data unit or packet arrival and the most recent data unit arrivals from other nodes on a per-event basis. The most recent data unit arrivals from the other nodes may be weighted so that more recent chunks are weighted higher than less recent data units.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

Moreover, the acts in FIG. 5 need not be implemented in the order shown; nor do all of the acts need to be performed. Also, those acts which are not dependent on other acts may be performed in parallel with the other acts. No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A system for determining the point of entry of a malicious packet into a network, comprising:
    an intrusion detection device configured to detect entry of the malicious packet into the network;
    a stepping stone detection device configured to detect stepping stones in extended connections within the network, identify correlated connection pairs according to the detected stepping stones, and produce a table of connection pairs based upon the identified correlated connection pairs; and
    a traceback engine responsive to operation of the intrusion detection device and configured to isolate the malicious packet, the traceback engine configured to:
        generate a query message containing identification information about the malicious packet;
        forward the query message to certain of a plurality of routers operatively connected to the traceback engine, the certain of the plurality of routers being configured to generate a representation of a plurality of packets as the packets are forwarded through the network and determine based on the representation whether the malicious packet has been transmitted through certain of the routers in response to the forwarded query message; and
        determine, using the established connection pair table, a previously received representative packet, the representative packet being from an incoming connection correlated with the connection including the malicious packet; and
        use the representative packet determined from the detected stepping stones to determine the point of entry of the malicious packet.

2. The system of claim 1, wherein the table of connection pairs includes IP addresses, incoming and outgoing ports, representative packets, and time last seen for each correlated pair.

3. The system of claim 1, wherein the certain of the plurality of routers being further configured to:
    notify the traceback engine that the malicious packet was not transmitted through the certain of the routers;
    notify the traceback engine that the malicious packet was transmitted through the certain of the routers; and displaced one hop from the certain of the plurality of routers;
    whereby determination of the point of entry of the malicious packet is pursued on a hop-by-hop basis.

4. The system of claim 3, wherein the traceback engine is further configured to:
    determine whether none of the plurality of routers report that the malicious packet was transmitted therethrough, indicating a ingress point or stepping stone host for the malicious packet; and
    generate a query message to the connection pair table maintained by the stepping stone detection system when none of the plurality of routers report that the malicious packet was transmitted therethrough,
    wherein the query message includes the malicious packet, source and destination IP addresses and incoming and outgoing ports.

5. The system of claim 4, wherein the stepping stone detection system is further configured to:
  identify a connection associated with the connection of the query message.

6. The system of claim 1, wherein the traceback engine is further configured to:
  generate a second query message containing identification information about the representative packet; and
  forward the query message to certain of the plurality of routers to determine based on the representation whether the representative packet has been transmitted through certain of the plurality of the routers in response to the second forwarded query message.

7. The system of claim 1, wherein the stepping stone detection device is further configured to identify the correlated connection pairs and produce the table of connection pairs before the intrusion detection device detects entry of the malicious packet.

8. In a network carrying a plurality of packets at least one of the packets being a target packet, the network including at least one network component, a detection device and a traceback engine, a method for determining a point of entry of a target packet into the network, the method comprising:
  at the traceback engine, receiving the target packet from the detection device;
  sending a query message identifying the target packet to a first component of the at least one network component;
  receiving a reply containing information about the target packet from the first component;
  processing the reply to extract the information;
  sending a second query message to a second component to identify possible correlated connections according to a table of correlated connection pairs of incoming and outgoing connections;
  receiving a reply containing information about the target packet from the second component, the information including a previously received representative packet from an incoming connection correlated with the outgoing connection of the target packet;
  processing the reply to extract the information; and
  determining the point of entry based on the information.

9. The method of claim 8, wherein the detection device is incorporated into the traceback engine.

10. The method of claim 8, wherein the sending operates to include the target packet into the query message.

11. The method of claim 8, wherein the one of the at least one network component is located one hop away from the traceback engine.

12. The method of claim 8, wherein the first component forwards the reply to another of the at least one network component.

13. The method of claim 8, wherein the first component is a router.

14. The method of claim 13, wherein the router includes a data generation agent producing packet digests of each packet forwarded through the router, and storing the digests in time-stamped digest tables.

15. The method of claim 8, wherein the second component is a stepping stone detection system for generating the correlated connection pair table.

16. A non-transitory computer-readable medium incorporating instructions for determining a point of entry of a target packet into a network, the network including a network component for generating a representation of an intruding packet as the packet is forwarded through the network, a second network component for identifying correlated connection pairs in the network, a traceback engine, and an intrusion detection device, comprising:
  one or more instructions for generating a query message comprising information about at least a portion of the intruding packet, the query message being created by the traceback engine in response to a triggering event indicating the intruding packet was detected by the intrusion detection device;
  one or more instructions for transmitting the query message to the network component;
  one or more instructions for receiving a reply generated by the network component in response to the query message, the network component matching the representation to the information in the query message and indicating a match there between,
  the match indicating the intruding packet has been encountered and indicating the source and destination addresses of the intruding packet;
  one or more instructions for generating a second query message comprising information about at least outgoing connection information for the intruding packet, the second query message being created by the traceback engine;
  one or more instructions for transmitting the second query message to the second network component; and
  one or more instructions for receiving a reply generated by the second network component in response to the second query message, the second network component identifying an incoming connection correlated to the outgoing connection according to a table of identified correlated connection pairs of incoming and outgoing connections, and indicating a previously received representative packet from the incoming connection and a time last seen of the representative packet.

17. In a network carrying a plurality of packets, the plurality of packets including a target packet having entered the network through an intrusion location, a method for determining the point of entry of a malicious packet into the network, comprising:
  processing a triggering event to extract information about the target packet;
  generating a query for placement onto the network, the query including at least a representation of the information about at least a portion of the target packet;
  sending the query to a network component;
  receiving a reply from the network component, the reply based on at least one packet digest produced as each of the plurality of packets is forwarded through the network and including at least outgoing connection information for identified matching packets;
  processing the reply;
  generating a second query for placement onto the network, the second query including a least the outgoing connection information;
  sending the second query to a second network component;
  receiving a second reply from the second network component, the second reply indicating an incoming connection previously associated with the outgoing connection according to a table of identified correlated connection pairs of incoming and outgoing connections;
  processing the second reply; and
  using the second reply to facilitate identification of the intrusion location.

18. The method of claim 17, wherein the reply is generated only if the network component has observed the target packet.

19. The method of claim 17, wherein the second reply is generated only if the second network component has identified an incoming connection associated with the outgoing connection.

20. The method of claim 17, wherein the at least one packet digest comprises a bloom filter having k hash functions, wherein said bloom filter computers k distinct packet digests for each packet using independent uniform hash functions.

21. A method, comprising:
receiving, at a source path isolation engine traceback manager, a determination by an intrusion detection system that an exceptional event has occurred, said determination being in the form of a traceback request, the traceback request comprising a packet, P, a victim, V, and a time of attack, T;
dispatching, from the traceback manager upon receipt of the traceback request, a query message containing the P, V, and T to a source path isolation engine collection and reduction agent for processing, the reduction agent being responsible for the region of the network including victim V;
polling, by the reduction agent, each source path isolation engine enhanced router including a data generation agent and associated with the reduction agent;
receiving, from each data generation agent, a reply indicating whether the target packet P was seen by the data generation agent;
associating the reply corresponding to the respective enhanced router of the data generation agent as active path data if the packet P was seen;
building a source path trace of possible paths taken by the target packet P based on the path data;
forwarding the source path tree to the traceback manager accompanied by a time T' the packet entered the region for which the enhanced router is responsible and the entering packet itself P';
attempting to identifying, by the traceback manager, the ingress point for the packet P';
if the traceback manager is unable to determine the ingress point, then process subsequent responses from participating routers located a hop away from the region of the network comprising at least a subset of the victim V, the additional hop requests comprising packet P', a border router between the two network regions designated as victim V', and T' as the time of attack;
producing, by a stepping stone detection process, a table of connection pairs such that, given an outgoing connection the table indicates an incoming connection relating to the identified ingress point for the packet P';
tracing the packet P' to the router nearest to an ingress point that is a stepping stone host;
continuing the trace across the stepping stone host by querying the established connection pair table to determine the next connection to trace according to the packet P';
receiving corresponding incoming connection information from the connection pair table including a new target packet, a time the new target packet was last seen, and a last router known to have seen the new target packet; and
constructing a new query based on the new target packet and the time the new target packet was last seen and continuing the trace.

22. The method of claim 21, wherein the victim V is represented in terms of a last-hop router and not the end host.

* * * * *